No. 764,427. PATENTED JULY 5, 1904.
J. E. COOPER.
ANTIFRICTION MECHANISM AS APPLIED TO THE AXLE SHAFTS OF CARRIAGES OR VEHICLES.
APPLICATION FILED MAR. 14, 1903.
NO MODEL. 2 SHEETS—SHEET 1.
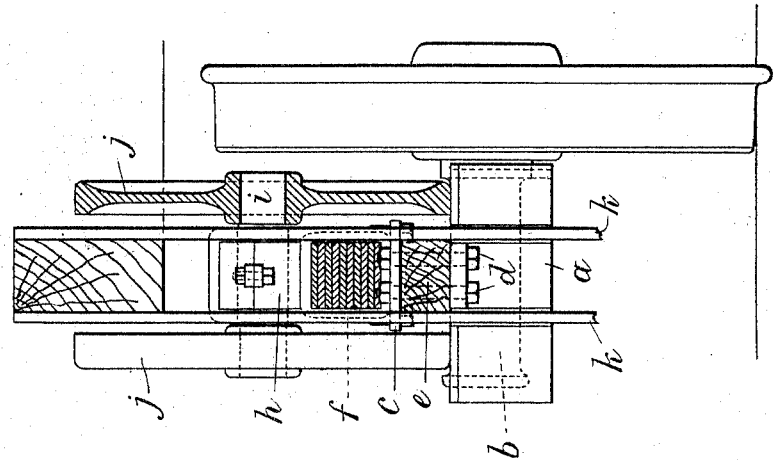
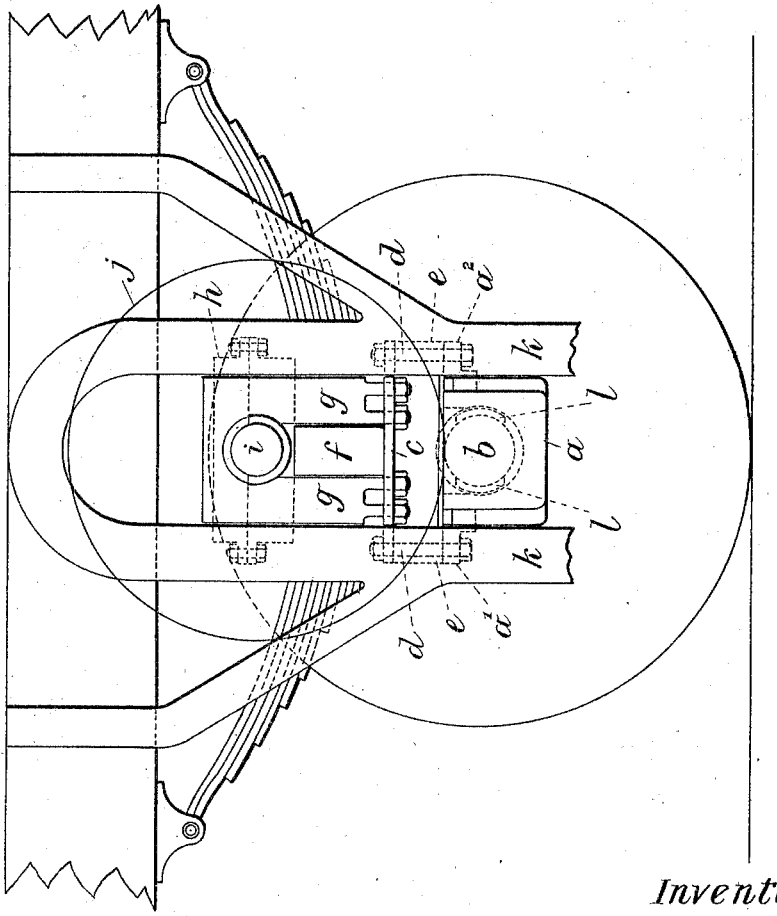
Witnesses.
Fred W. Englert
Geo. H. Byrne
Inventor.
J. E. Cooper,
by Wilkinson & Fisher,
Attorneys.

No. 764,427. PATENTED JULY 5, 1904.
J. E. COOPER.
ANTIFRICTION MECHANISM AS APPLIED TO THE AXLE SHAFTS OF CARRIAGES OR VEHICLES.
APPLICATION FILED MAR. 14, 1903.
NO MODEL. 2 SHEETS—SHEET 2.

Witnesses.

Inventor.
J. E. Cooper,
Attorneys.

No. 764,427. Patented July 5, 1904.

UNITED STATES PATENT OFFICE.

JOHN EDWARD COOPER, OF SILVERTOWN, LONDON, ENGLAND.

ANTIFRICTION MECHANISM AS APPLIED TO THE AXLE-SHAFTS OF CARRIAGES OR VEHICLES.

SPECIFICATION forming part of Letters Patent No. 764,427, dated July 5, 1904.

Application filed March 14, 1903. Serial No. 147,843. (No model.)

*To all whom it may concern:*

Be it known that I, JOHN EDWARD COOPER, a subject of the King of Great Britain and Ireland, residing at Silvertown, London, England, have invented certain new and useful Improvements in Connection with the Antifriction Mechanism of the Axle-Shafts of Railway-Carriages and other Vehicles; and I do hereby declare the following to be a full, clear, and exact description of the invention, such as will enable others skilled in the art to which it appertains to make and use the same.

This invention relates to antifriction mechanism as applied to the axle-shafts of carriages or vehicles in the manner described and illustrated in the specification of Letters Patent No. 621,483, bearing date March 21, 1899, and as improved by combining therewith suitably-devised forms of springs in the manner described and illustrated in the specification of Letters Patent No. 681,650, bearing date August 27, 1901.

In the former specification it is stated that "the axle-boxes are secured to an adjusting and guide box by which they are kept to the exact distance apart and are also accurately guided to share the same vertical movement in exact line with each other. Upon this arrangement depends the proper rolling contact between the disk or wheel on the antifriction-axle and the collar on the main axle," and this relation of parts, in combination with a spring on which to mount the car or body of the vehicle and thereby adapt the former invention to the rolling-stock of railways, is the object in view, as described in the latter specification. By my present invention I effect this latter object by an improved combination of parts which are thought to have several practical advantages.

Having thus indicated the nature and utility of my invention, in order that it may be clearly understood and readily carried into effect I will proceed to describe the same with reference to the accompanying drawings, in which like letters of reference indicate corresponding parts in all the figures.

Figure 3:
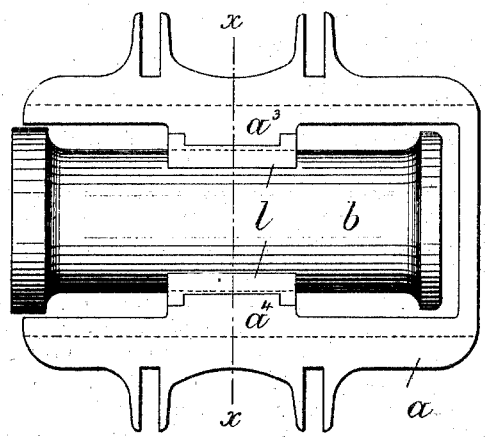
Figure 4:
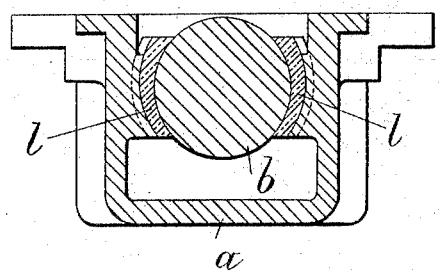
Figure 5:
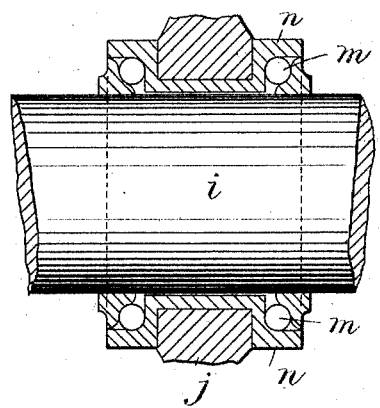
Figure 6:
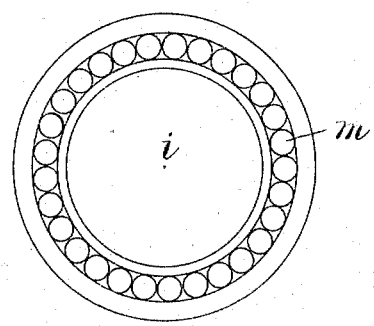
Figure 7:
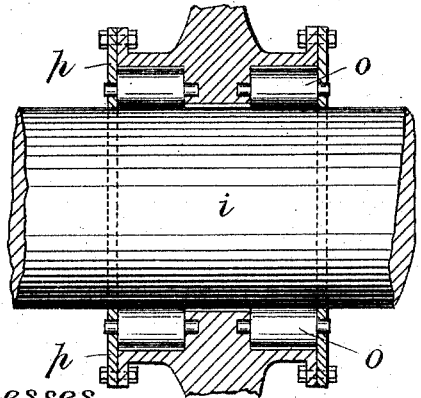
Figure 8:
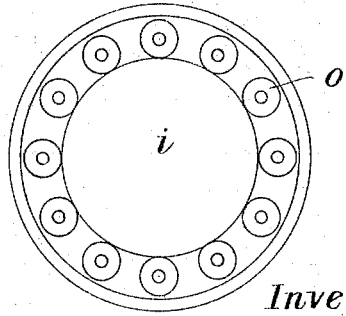

Figure 1 illustrates in side elevation part of a railway-vehicle, showing the application of my invention to the existing rolling-stock, corresponding to which Fig. 2 is an end elevation, partly in section. Fig. 3 is a detail plan view, drawn to an enlarged scale, illustrating the journal-box for the main axle, corresponding to which Fig. 4 is a transverse sectional view taken on line $xx$ of Fig. 3. Figs. 5 and 6 are enlarged sectional and end elevations, respectively, of the antifriction-axle fitted with ball-bearings; and Figs. 7 and 8 are similar views showing the application of roller-bearings to the antifriction-axle.

Referring to Figs. 1 and 2, in applying the present invention to railway-vehicles in a manner adapted to the existing rolling-stock I provide a journal-box $a$ for the lower or main axle $b$, connected to a transom-plate $c$ by bolts $d$, wooden packing-pieces $e\ e$ being placed between lugs $a'\ a^2$ on the journal-box and the transom-plate, which may also be furnished with corresponding lugs. The transom-plate is in turn bolted against the bottom of the bearing-spring buckle $f$ by straps $g\ g$, which pass horseshoe fashion over the upper or journal block or split axle-box $h$ of the antifriction-shaft $i$, on which are mounted the antifriction-disks $j\ j$. In this way there is a rigid connection between the journal $b$, journal-box $a$ and collar of the main axle or shaft, the journal $i$, journal-box $h$, and rolling-disks $j\ j$ of the antifriction-axle $i$ and the bearing-spring buckle $f$, which comes between. The journal-boxes are accurately adjusted in a guide-frame $k$ to insure that they share the same vertical movement, in conjunction with the provision that they be kept the same distance apart. In the case of the main axle the axle-box must be of sufficient width to allow the axle to pass freely into the box. The brasses $l\ l$ on both sides being of the circular form shown are passed round the axle, which cannot then be drawn out until the brasses are first taken out.

Referring to Figs. 3 and 4, a special feature of the journal-box $a$ for the main axle $b$ is the construction of same, which is made with internal bearings $a^3\ a^4$ on opposite sides of the axle-box, preferably in line with the transverse diameter. These internal bearings or supports for the brasses $l\ l$ are of the circular form shown and are made to fit the back parts of the brasses, which must not exceed the semicircle and in practice are preferably rather less, the inside of the brasses being made to fit the main axle. The object of this form of bearing is such that after the brasses are placed in position there can be no vertical or other dislocation of the main shaft, which is held rigidly in respect to such movement, but in rolling contact with the brasses, until these are taken out, which can only be done by working them round the shaft clear of their bearings. The brasses are made slightly thicker at the top end for taking up wear, which can be done by removing metal from the bottom, thus allowing the brasses to lower as the wear takes place.

I also propose a further improvement in reference to antifriction mechanism as applied to the axle-shafts of vehicles wherever the antifriction-axle shaft is fast and the antifriction wheels or disks run loose by the introduction of balls or rollers or both, these balls or rollers being placed to run within the hubs of the antifriction disks or wheels, thus reducing the friction set up by the same to a minimum.

In case ball-bearings are used, as shown in Figs. 5 and 6, I cause the balls $m$ to run in a recess on an adjustable cone $n$, recessed into each side of the antifriction-wheel $j$, made of suitable metal.

When roller-bearings are used, as shown in Figs. 7 and 8, instead of the ordinary form of rollers passing right through the wheel I utilize short rollers $o$, extending into the hub of the wheel one-third the length of the hub from each side, thus allowing the said short rollers (which are fixed in a cage $p$ within the hub) to run perfectly clear and free from contact with those placed in the opposite hub.

Having thus described my invention, what I claim, and desire to secure by Letters Patent of the United States, is—

In antifriction mechanism for railway-carriages and other vehicles, the combination of a bearing-spring, journal-boxes secured to said bearing-spring above and below the same, respectively, a main axle mounted in the lower box, an antifriction-axle, provided with antifriction wheels or rollers, mounted in the upper box, a transom-plate to which said lower journal-box is secured and a guide-frame for both of said boxes, substantially as described.

In testimony whereof I affix my signature in presence of two witnesses.

JOHN EDWARD COOPER.

Witnesses:
 HERBERT SELLEY,
 CHARLES HALE.